(12) United States Patent
Lin et al.

(10) Patent No.: US 12,078,879 B2
(45) Date of Patent: Sep. 3, 2024

(54) CHOLESTERIC LIQUID CRYSTAL DISPLAY DEVICE AND CONTROL METHOD FOR REDUCING INRUSH CURRENT WHEN CLEARING PICTURE

(71) Applicant: IRIS OPTRONICS CO., LTD., Tainan (TW)

(72) Inventors: Chi-Wei Lin, Tainan (TW); Wu-Chang Yang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 18 days.

(21) Appl. No.: 18/078,090

(22) Filed: Dec. 8, 2022

(65) Prior Publication Data

US 2023/0185121 A1 Jun. 15, 2023

(30) Foreign Application Priority Data

Dec. 9, 2021 (TW) .................................. 110146032

(51) Int. Cl.
*G02F 1/133* (2006.01)
*G02F 1/137* (2006.01)

(52) U.S. Cl.
CPC .......... *G02F 1/13306* (2013.01); *G02F 1/137* (2013.01); *G02F 2201/50* (2013.01)

(58) Field of Classification Search
CPC .................................................. G02F 1/13306
See application file for complete search history.

(56) References Cited

U.S. PATENT DOCUMENTS

| 10,509,250 | B2 * | 12/2019 | Liao ................... G02F 1/134336 |
| 2005/0068279 | A1 * | 3/2005 | Hirota .................. G09G 3/3659 |
| | | | 257/E27.111 |
| 2008/0273023 | A1 | 11/2008 | Nose et al. |
| 2017/0176784 | A1 | 6/2017 | Braganza et al. |

FOREIGN PATENT DOCUMENTS

| CN | 101361018 A | 2/2009 |
| TW | 202144886 A | 12/2021 |

* cited by examiner

*Primary Examiner* — Edmond C Lau
(74) *Attorney, Agent, or Firm* — Cheng-Ju Chiang

(57) ABSTRACT

A cholesteric liquid crystal display device and a control method for reducing inrush current when clearing the screen. The cholesteric liquid crystal display device includes a cholesteric liquid crystal display panel and a liquid crystal drive unit. The cholesteric liquid crystal display panel has a plurality of pixel matrix. After the liquid crystal drive unit receives a data latch enable signal, it applies a reset voltage to the plurality of pixel matrix to clear the screen displayed on the cholesteric liquid crystal display panel. The input time of the data latch enable signal received by the liquid crystal driving unit is different, and the corresponding signal time portion is shifted with each other.

18 Claims, 5 Drawing Sheets

S01
Red Data Latch Enable Signal (DLE R) Applied To Liquid Crystal Driving Unit, and Clear Voltage Applied To Segment Electrodes (SEG) and Common Electrodes (COM) Of Red Pixel Matrix

S02
Time-shifted Green Data Latch Enable Signal Outputted To Liquid Crystal Driving Unit, and Clear Voltage Applied To Segment Electrodes (SEG) and Common Electrodes (COM) Of Green Pixel Matrix

S03
Time-shifted Blue Data Latch Enable Signal Outputted To Liquid Crystal Driving Unit, and Clear Voltage Applied To Segment Electrodes (SEG) and Common Electrodes (COM) Of Blue Pixel Matrix

Fig. 5

CHOLESTERIC LIQUID CRYSTAL DISPLAY DEVICE AND CONTROL METHOD FOR REDUCING INRUSH CURRENT WHEN CLEARING PICTURE

BACKGROUND OF THE INVENTION

1. Field of the Invention

The present invention relates to a cholesteric liquid crystal display, and in particular, to a cholesteric liquid crystal display device and a control method for reducing inrush current and clearing the screen of the cholesteric liquid crystal display device.

2. Description of Related Art

A cholesteric liquid crystal display device (ChLCD) has bi-stable characteristic, and while an electric field is not applied, the ChLCD can maintain screen (or information) and be power-saving. The ChLCD technology can be applied at a flexible E-Paper, outdoor ChLCD displays, and corporate name tags, etc.

The cholesteric liquid crystal display device has a cholesteric liquid crystal display panel and driver ICs, and the cholesteric liquid crystal display panel has a plurality of pixel matrix. In general, the pixel matrix includes a red pixel matrix, a blue pixel matrix and a green pixel matrix, and the driver ICs apply reset signals to clear the screen of the cholesteric liquid crystal display device in the same time.

However, the driver ICs apply the reset signals with high positive and negative level of voltages to the pixel matrix and clear previous screen in the same time. It results in voltage build-up in liquid crystal molecules of the pixel matrix and an excessive inrush current so that the power supply of the ChLCD is subjected to large load. Cost of the driver ICs for the ChLCD is higher as well.

Therefore, to overcome disadvantages mentioned above, the present invention provides a cholesteric liquid crystal display device and a control method for reducing inrush current and clearing the screen of the cholesteric liquid crystal display device. The disadvantages mentioned above has become one of sought-after technical issue in this field of technology.

SUMMARY OF THE INVENTION

The present invention provides a cholesteric liquid crystal display device and a control method for reducing inrush current and clearing the screen of the cholesteric liquid crystal display device so as to alleviate a load for a power supply of the ChLCD and save manufacturing cost.

To achieve one or more advantages mentioned above, the present invention provides an embodiment, illustrating a cholesteric liquid crystal display device which includes a cholesteric liquid crystal display panel, a timing control driver, and a liquid crystal driving unit.

The cholesteric liquid crystal display panel has a plurality of pixel matrix, the timing control driver is outputting a plurality of enable signals corresponding to the pixel matrix, wherein the enable signals are outputted by different timing and the liquid crystal driving unit is electrically coupled to the cholesteric liquid crystal display panel and the timing control driver. After the liquid crystal driving unit receives an enable signals by the timing control driver, the liquid crystal driving unit applies a reset voltage to the plurality of pixel matrix so as to clear the screen of the cholesteric liquid crystal display panel.

Furthermore, the cholesteric liquid crystal display panel has a plurality of pixel matrix, and has a plurality of common electrodes (COM) and segment electrodes (SEG) which are disposed longitudinally and transversely. The common electrodes (COM) and the segment electrodes (SEG) constitutes the pixel matrix to display the screen. Generally, based on three primary colors, each of the pixel matrix have at least a red pixel matrix, a blue pixel matrix, and a green pixel matrix. Based on the red data latch enable signal (DLE R), the blue data latch enable signal (DLE B), and the green data latch enable signal (DLE G), the data latch enable signal is outputted to the liquid crystal driving unit by different timing respectively. The reset voltage is applied to the red pixel matrix, the blue pixel matrix, and the green pixel matrix so as to reduce inrush current and clear the screen.

The timing control driver outputs a red enable signal, a blue enable signal, and a green enable signal corresponding to the red pixel matrix, the blue pixel matrix and the green pixel matrix to the liquid crystal driving unit respectively, and the timing control driver supplies the red enable signal, the blue enable signal, and the green enable signal by different timings.

And the liquid crystal driving unit supplies a voltage to the common electrodes (COM) and the segment electrodes (SEG) of the pixel matrix respectively clear the screen of the pixel matrix after the liquid crystal driving unit receives the enable signals. Additional information is that the liquid crystal driving unit increases a voltage based on the data latch enable signal so that the orientation of the liquid crystal molecules of the cholesteric liquid crystal display panel is in Homeotropic State. While the voltage is lowered, the orientation of the liquid crystal molecules is transitioned to Planar State, and the reset voltage is applied so as to clear the screen of the cholesteric liquid crystal display panel.

In the liquid crystal display device, the voltage supplied the common electrodes (COM) and the segment electrodes (SEG) of the pixel matrix respectively is amplified so that the waveforms of a negative voltage and a positive voltage are not overlapped.

And the enable signals are data latch enable signals in an electrical signal format.

Wherein each of the enable signals comprises a signal portion, and the signal portions corresponding to at least two of the red data latch enable signal (DLE R), the blue data latch enable signal (DLE B), and the green data latch enable signal (DLE G) are time-shifted. Then each of the enable signals further comprises a natural resetting portion, and the interval of the signal portion is longer than that of the natural resetting portion.

According to one embodiment, the present invention provides a control method for reducing inrush current and clearing the screen of the cholesteric liquid crystal display device. The control method is used to clear the screen of the cholesteric liquid crystal display device. Besides, the cholesteric liquid crystal display device has a cholesteric liquid crystal display panel with a plurality of pixel matrix and a timing control driver, and a liquid crystal driving unit, and the liquid crystal driving unit is electrically coupled to the cholesteric liquid crystal display panel and the timing control driver respectively. The control method of the present invention is used to clear the screen, and includes the steps in the following:

First of all, providing the cholesteric liquid crystal display device which comprises a cholesteric liquid crystal display panel with a plurality of pixel matrix, a timing control driver, and a liquid crystal driving unit electrically coupled to the cholesteric liquid crystal display panel. Then the timing control driver outputs a plurality of enable signals corresponding to the pixel matrix, wherein the enable signals are supplied by different timing. The liquid crystal driving unit receives the enable signals and supplying a reset voltage corresponding to the pixel matrix to clear the screen displayed by the pixel matrix.

The cholesteric liquid crystal display panel further comprises a plurality of common electrodes (COM) and segment electrodes (SEG), and the common electrodes (COM) and the segment electrodes (SEG) constitutes the pixel matrix and are electrically connected to the liquid crystal driving unit respectively.

And the pixel matrix further comprises at least a red pixel matrix, a blue pixel matrix and a green pixel matrix.

The timing control driver outputs a red enable signal, a blue enable signal, and a green enable signal corresponding to the red pixel matrix, the blue pixel matrix and the green pixel matrix to the liquid crystal driving unit respectively, and the timing control driver supplies the red enable signal, the blue enable signal, and the green enable signal by different timing.

The enable signals are data latch enable signals in an electrical signal format.

The liquid crystal driving unit supplies a voltage to the common electrodes (COM) and the segment electrodes (SEG) of the pixel matrix respectively to clear the screen displayed by the pixel matrix after the liquid crystal driving unit receives the enable signals.

And the voltage supplied to the common electrodes (COM) and the segment electrodes (SEG) of the pixel matrix respectively is amplified so that the waveforms of a negative voltage and a positive voltage are not overlapped.

Each of the enable signals comprises a signal portion. And the signal portions correspond to at least two of the red enable signal, the blue enable signal, and the green enable signal are time-shifted. Wherein each of the enable signals further comprises a natural resetting portion. And the interval of the signal portion is longer than that of the natural resetting portion.

Additional information is that the liquid crystal driving unit increases voltage based on the data latch enable signal so that orientation of the liquid crystal molecules of the cholesteric liquid crystal display panel is in Homeotropic State. While the voltage is lowered, the orientation of the liquid crystal molecules is transitioned to Planar State, and the to clear the screen of the cholesteric liquid crystal display panel.

Therefore, the present invention provides a cholesteric liquid crystal display, and a control method for reducing inrush current and clearing the screen of the cholesteric liquid crystal display device. Because the data latch enable signals are received by the liquid crystal driving unit in different timing, and the signal portions corresponding to the data latch enable signals are time-shifted so as to reduce inrush current and assembly cost and alleviate burden of the power supply of the liquid crystal driving unit.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

FIG. 5 is a flowchart of a control method for reducing inrush current of the present invention.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
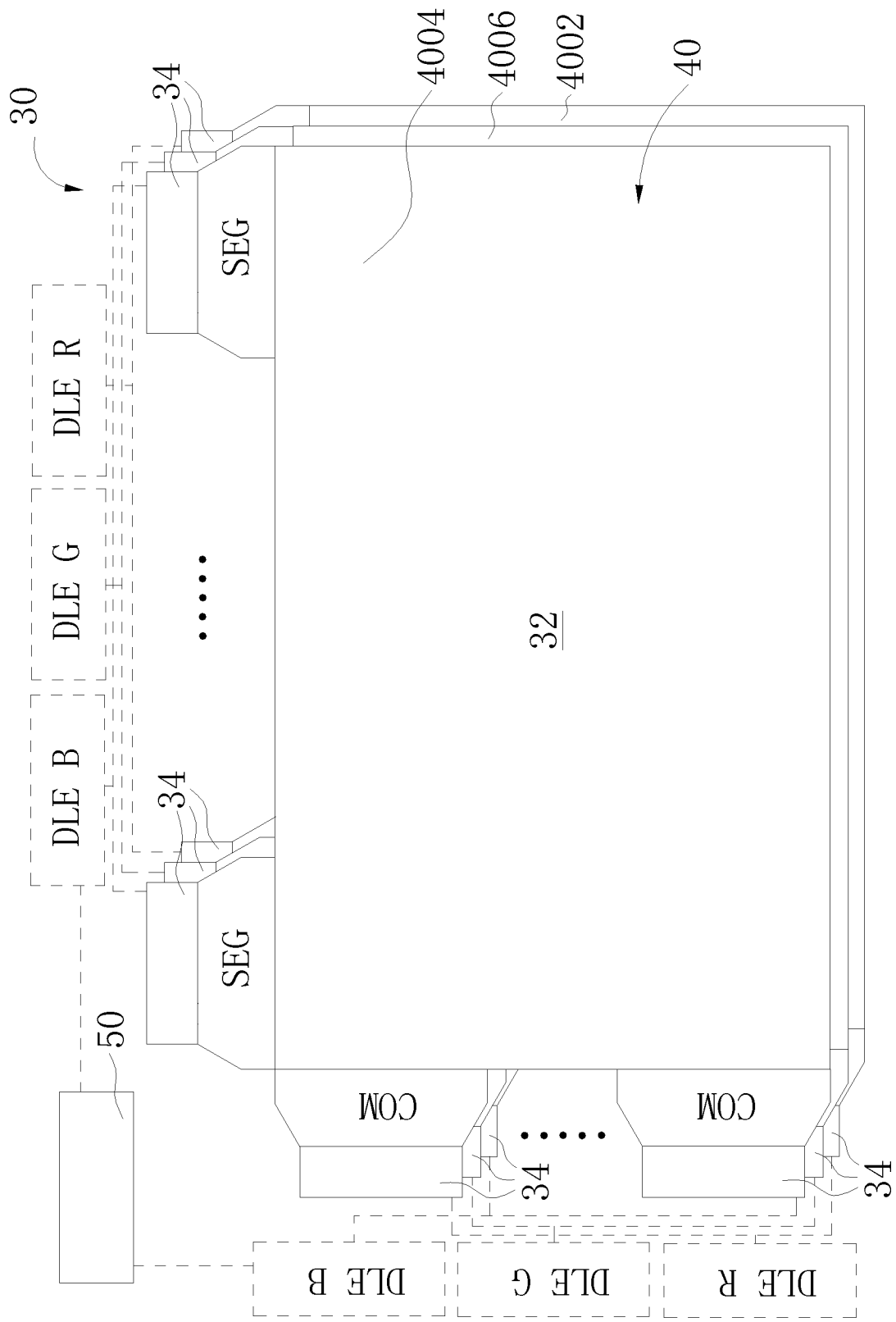
FIG. 1 is a schematic of a cholesteric liquid crystal display device of the present invention.

Referring to FIG. 1, it illustrates a schematic of a cholesteric liquid crystal display device 30 of the present invention. To achieve one or more advantages mentioned above, the present invention provides a cholesteric liquid crystal display device 30 which has a cholesteric liquid crystal display panel 32 and a liquid crystal driving unit 34.

The cholesteric liquid crystal display panel 32 has a plurality of pixel matrix 40, and has a plurality of common electrodes (COM) and segment electrodes (SEG) which are disposed longitudinally and transversely. The common electrodes (COM) and the segment electrodes (SEG) constitutes the pixel matrix 40 to display the screen. Generally, based on three primary colors, each of the pixel matrix 40 have a red pixel matrix 4002, a blue pixel matrix 4004, and a green pixel matrix 4006.

The liquid crystal driving unit 34 is electrically coupled to the cholesteric liquid crystal display panel 32. To begin with, a data latch enable (DLE) signal is generated by a timing controller (TCON) 50, after the liquid crystal driving unit 34 receives the data latch enable signal, the liquid crystal driving unit 34 applies a reset voltage to the common electrodes (COM) and the segment electrodes (SEG) of a plurality of pixel matrix 40 respectively so as to clear the screen of the cholesteric liquid crystal display panel 32. That is, after the liquid crystal driving unit 34 receives a red data latch enable signal (DLE R), a blue data latch enable signal (DLE B), and a green data latch enable signal (DLE G), the liquid crystal driving unit 34 applies a reset voltage to the common electrodes (COM) and the segment electrodes (SEG) of the red pixel matrix 4002, the blue pixel matrix 4004, and the green pixel matrix 4006 so as to clear the screen of the cholesteric liquid crystal display panel 32. Besides, the data latch enable signals are outputted to the pixel matrix 40 by different timing respectively.

Additional information is that the liquid crystal driving unit 34 increases the voltage based on the data latch enable signals so that the orientation of the liquid crystal molecules of the cholesteric liquid crystal display panel 32 is in Homeotropic State. While the voltage is lowered, the orientation of the liquid crystal molecules is transitioned to Planar State, and the reset voltage is applied so as to clear the screen of the cholesteric liquid crystal display panel 32.

Furthermore, the data latch enable signal has a signal portion and a natural resetting portion, and the interval of the signal portion is preferably longer than that of the natural resetting portion. If the voltage of the pixel matrix is not reset to zero voltage, the liquid crystal driving unit 34 consumes much more electrical energy to apply the reset voltage to erase non-zero voltage. The signal portions corresponding to at least two of the red data latch enable signal (DLE R), the blue data latch enable signal (DLE B), and the green data latch enable signal (DLE G) are preferably time-shifted, or the signal portions corresponding to the red data latch enable signal (DLE R), the blue data latch enable signal (DLE B), and the green data latch enable signal (DLE G) are time-shifted each other so as to avoid phenomena of overall inrush current.

To sum up, above-mentioned pixel matrix 40 has the red pixel matrix 4002, the blue pixel matrix 4004, and the green pixel matrix 4006. Because of different output timing and time-shifted signal portion, the red data latch enable signal (DLE R), the blue data latch enable signal (DLE B), and the green data latch enable signal (DLE G) of the data latch enable signal are outputted to the liquid crystal driving unit 34 respectively so as to apply the reset voltage to the red pixel matrix 4002, the blue pixel matrix 4004, and the green pixel matrix 4006 to reduce inrush current and clear the screen of the cholesteric liquid crystal display panel 32.

Figure 2:
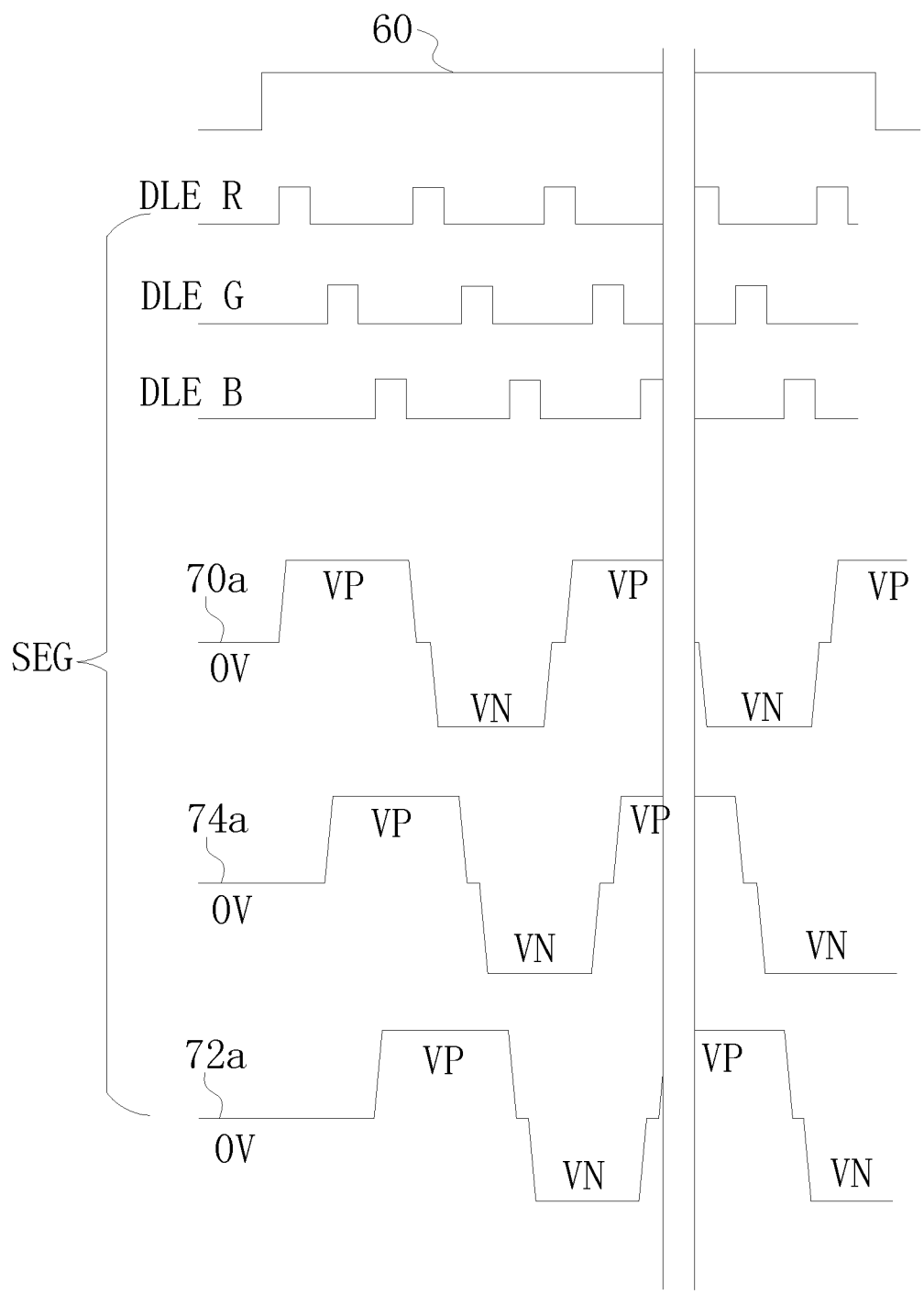
FIG. 2 is voltage waveforms of segment electrodes of the present invention.
Figure 3:
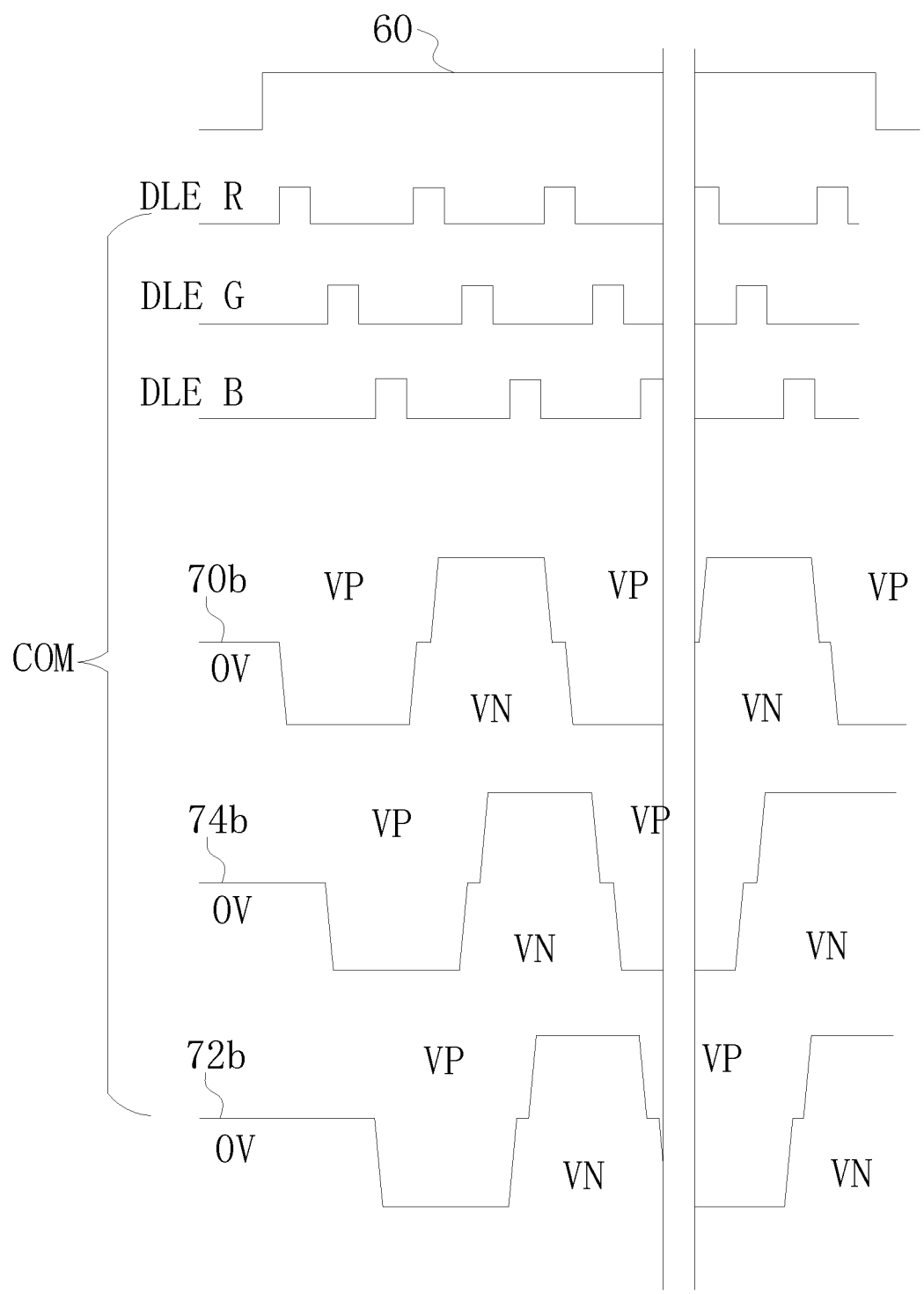
FIG. 3 is voltage waveforms of common electrodes of the present invention.

Referring to FIGS. 2 and 3, FIG. 2 shows voltage waveforms of the segment electrodes (SEG) of the present invention, and FIG. 3 illustrates voltage waveforms of the common electrodes (COM) of the present invention. The liquid crystal driving unit 34 applies the reset voltages to the segment electrodes (SEG) and the common electrodes (COM) to clear the screen. The reset voltage is defined as a reset phase waveform 60.

As shown in FIG. 2, the red data latch enable signal (DLE R), the blue data latch enable signal (DLE B), and the green data latch enable signal (DLE G) of the reset phase waveform 60 from the segment electrodes (SEG) are outputted in different timing, and the signal portions corresponding to the red data latch enable signal (DLE R), the blue data latch enable signal (DLE B), and the green data latch enable signal (DLE G) are interleaved. As shown in bottom of FIG. 2, based on the red data latch enable signal (DLE R), the blue data latch enable signal (DLE B), and the green data latch enable signal (DLE G), the liquid crystal driving unit 34 apply the reset voltage such as a red output voltage 70a, a blue output voltage 72a, and a green output voltage 74a to the red pixel matrix 4002, the blue pixel matrix 4004, and the green pixel matrix 4006, respectively.

If the red output voltage 70a, the blue output voltage 72a, and the green output voltage 74a are applied to a positive voltage VP and a negative voltage VN, and the waveforms of the positive voltage VP and the negative voltage VN are partly overlapped, the inrush current is likely induced. The positive voltage VP and the negative voltage VN of these waveforms as shown in FIG. 2 are time-shifted so the inrush current can be avoided.

Similarly, FIG. 3 illustrates that the red data latch enable signal (DLE R), the blue data latch enable signal (DLE B), and the green data latch enable signal (DLE G) of the reset phase waveform 60 from the common electrode (COM) are outputted in different timing, and signal portions corresponding to the red data latch enable signal (DLE R), the blue data latch enable signal (DLE B), and the green data latch enable signal (DLE G) are interleaved. As shown in bottom of FIG. 3, based on the red data latch enable signal (DLE R), the blue data latch enable signal (DLE B), and the green data latch enable signal (DLE G), the liquid crystal driving unit 34 applies a red output voltage 70b, a blue output voltage 72b, and a green output voltage 74b to the reset voltage to the red pixel matrix 4002, the blue pixel matrix 4004, and the green pixel matrix 4006, respectively.

If the red output voltage 70b, the blue output voltage 72b, and the green output voltage 74b are applied to the positive voltage VP and the negative voltage VN, and the waveforms of the positive voltage VP and the negative voltage VN are partly overlapped, then the inrush current is likely induced. The positive voltage VP and the negative voltage VN of these waveforms as shown in FIG. 3 are time-shifted so the inrush current can be avoided.

Figure 4:
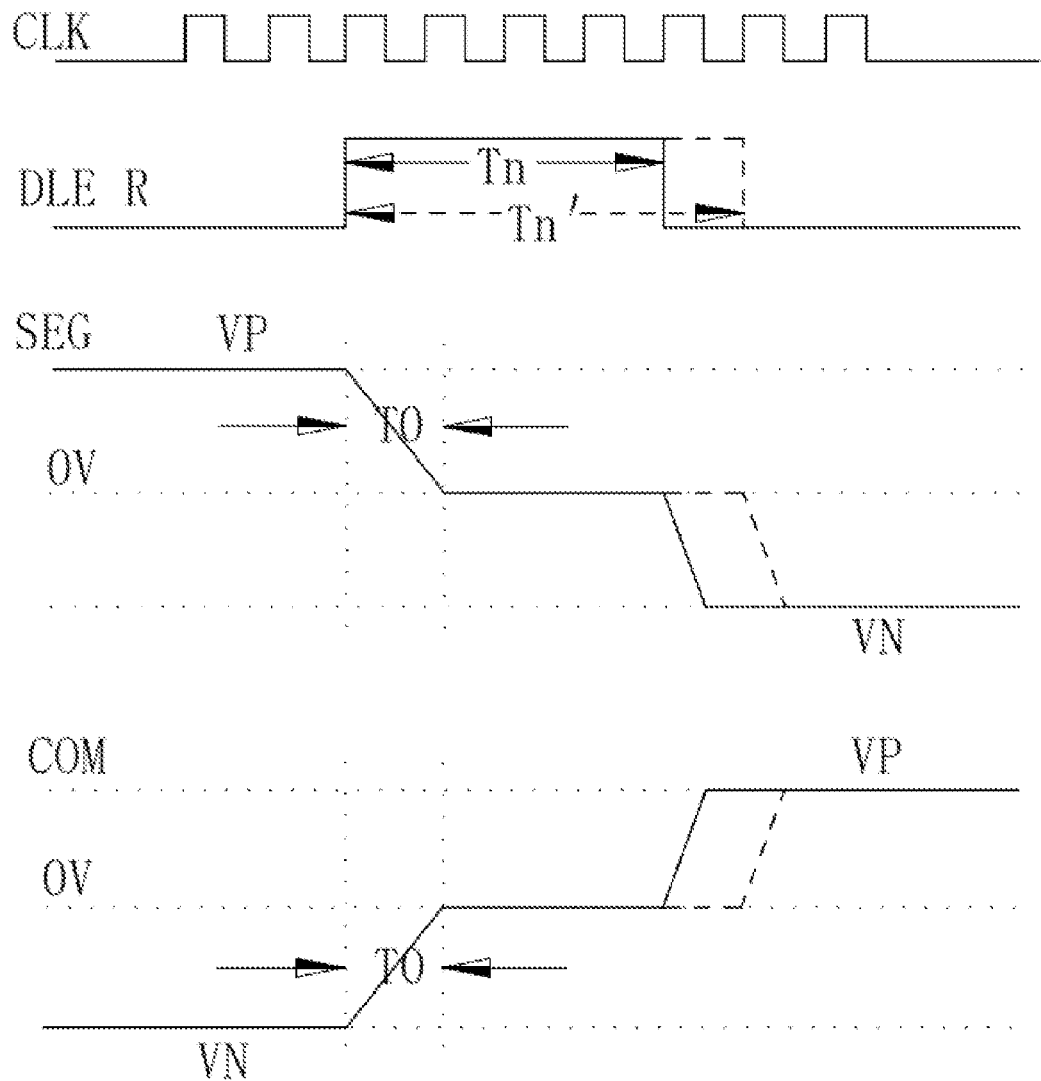
FIG. 4 is waveforms of a signal portion of the output voltage of the present invention.

Referring to FIG. 4, it shows waveforms of a signal portion of the output voltage (red data latch enable signal (DLE R)) of the present invention. The first waveform from the top of FIG. 4 is a clock reference signal waveform CLK. As shown in FIG. 4, the signal portion Tn of the red data latch enable signal (DLE R) may be modified to the signal portion Tn'. The enable voltage status of the red data latch enable signal (DLE R) is Enabled (or ON) in the interval of the signal portions Tn, or Tn', and the signal portions Tn, or Tn' are measured in unit of time. Waveforms of below the red data latch enable signal (DLE R) of FIG. 4 illustrates how the positive voltage VP and the negative voltage VN of the segment electrodes (SEG) and the common electrode (COM) are changing respectively. As to the signal portion waveform from the segment electrodes (SEG), the positive voltage VP is reset to zero voltage, and the negative voltage VN of the waveform is applied by the liquid crystal driving unit 34. As to the signal portion waveform from the common electrode (COM), the negative voltage VN is reset to zero voltage, and the positive voltage VP of the waveform is applied by the liquid crystal driving unit 34. The segment electrodes (SEG) and the common electrode (COM) utilize the level changes of the positive voltage VP and the negative voltage VN to clear the image of the display panel. While the enable voltage status of the red data latch enable signal (DLE R) is Enabled (or ON), the processes of the positive voltage VP or the negative voltage VN resetting to zero will happen. The processes are called the natural resetting portion TO, and measured in unit of time as well. Please note that the interval of the signal portion Tn and Tn' are preferably longer than that of the natural resetting portion TO so that the liquid crystal driving unit 34 may consume much more electrical energy to apply the reset voltage to offset non-zero voltage before the signal portion is not reset to zero voltage.

Furthermore, the interval of the signal portion Tn' is extended longer than that of the natural resetting portion TO so as to help discharge and reduce inrush current. While the interval of the signal portion Tn' is extended, it is preferably that all of the positive voltage VP and the negative voltage VN of the waveforms should be shifted.

Referring to FIG. 5, it shows a flowchart of a control method for reducing inrush current of the present invention. In an embodiment, the present invention provides a control method for reducing inrush current and clearing the screen of the cholesteric liquid crystal display device 30. The control method is used to clear the screen of the cholesteric liquid crystal display device 30 which has the cholesteric liquid crystal display panel 32 with a plurality of pixel matrix 40 and the liquid crystal driving unit 34, and the liquid crystal driving unit 34 is electrically coupled to the cholesteric liquid crystal display panel 32 and used to clear the screen with help of the control method of the present invention.

The control method of the present invention is to generate the data latch enable signal by a timing control driver 50. After the liquid crystal driving unit 34 receives the data latch enable signal, the liquid crystal driving unit 34 applies a reset voltage to the common electrodes (COM) and the segment electrodes (SEG) of a plurality of pixel matrix 40 respectively so as to clear the screen of the cholesteric liquid crystal display panel 32. The liquid crystal driving unit 34 receives the data latch enable signals which are outputted by different timing.

Referring to FIGS. 2 and 3, the pixel matrix 40 has the red pixel matrix 4002, the blue pixel matrix 4004, and the green pixel matrix 4006. The red data latch enable signal (DLE R), the blue data latch enable signal (DLE B), and the green data latch enable signal (DLE G) of the data latch enable signal are outputted to the liquid crystal driving unit 34 by different timing so that the reset voltage is applied to the red pixel matrix 4002, the blue pixel matrix 4004, and the green pixel matrix 4006 to reduce the inrush current and clear the screen of the cholesteric liquid crystal display panel 32. The control method includes the steps as follows.

Step 01: The red data latch enable signal (DLE R) is applied to the liquid crystal driving unit 34, and the red output voltage 70a is outputted to the segment electrodes (SEG) of the red pixel matrix 4002 so that the positive voltage VP and the negative voltage VN are applied and generated. Meanwhile, the red data latch enable signal (DLE R) is applied to the liquid crystal driving unit 34, and the red output voltage 70b is outputted to the common electrodes (COM) of the red pixel matrix 4002 so that the positive voltage VP and the negative voltage VN are applied and generated as well.

Step 02: The green data latch enable signal (DLE G) is shifted from the red data latch enable signal (DLE R) by different timing and applied to the liquid crystal driving unit 34, and the green output voltage 74a is outputted to the segment electrodes (SEG) of the green pixel matrix 4006 so that the positive voltage VP and the negative voltage VN are applied and generated. Meanwhile, the green data latch enable signal (DLE G) is interleaved with the red data latch enable signal (DLE R) by different timing and applied to the liquid crystal driving unit 34, and the green output voltage 74b is outputted to the common electrodes (COM) of the green pixel matrix 4006 so that the positive voltage VP and the negative voltage VN are applied and generated as well.

Step 03: The blue data latch enable signal (DLE B) is shifted from the red data latch enable signal (DLE R) and the green data latch enable signal (DLE G) by different timing and applied to the liquid crystal driving unit 34, and the blue output voltage 72a is outputted to the segment electrodes (SEG) of the blue pixel matrix 4004 so that the positive voltage VP and the negative voltage VN are applied and generated. Meanwhile, the blue data latch enable signal (DLE B) is interleaved with the red data latch enable signal (DLE R) and the green data latch enable signal (DLE G) by different timing and applied to the liquid crystal driving unit 34, and the blue output voltage 72b is outputted to the common electrodes (COM) of the blue pixel matrix 4004 so that the positive voltage VP and the negative voltage VN are applied and generated as well.

Furthermore, the data latch enable signal has the signal portion and the natural resetting portion, and the interval of the signal portion is preferably longer than that of the natural resetting portion. If the pixel matrix is not reset to zero voltage, the liquid crystal driving unit 34 consumes much more electrical energy to apply the reset voltage to erase non-zero voltage. In addition, the signal portions corresponding to at least two of the red data latch enable signal, the blue data latch enable signal, and the green data latch enable signal are preferably interleaved so as to avoid phenomena of overall inrush current Additional information is that the liquid crystal driving unit 34 increases the voltage based on the data latch enable signal so that the orientation of the liquid crystal molecules of the cholesteric liquid crystal display panel 32 is in Homeotropic State. While the voltage is lowered, the orientation of the liquid crystal molecules is transitioned to Planar State, and the reset voltage is applied so as to clear the screen of the cholesteric liquid crystal display panel 32.

To sum up, the present invention provides a cholesteric liquid crystal display device 30 and a control method for reducing inrush current and clearing the screen of the cholesteric liquid crystal display device 30. The liquid crystal driving unit 34 receives the data latch enable signal by different timing, and the signal portions of the data latch enable signal are interleaved so as to reduce inrush current, alleviate burden of the power supply and reduce assembly cost of the liquid crystal driving unit 34.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device, comprising:
   a cholesteric liquid crystal display panel, comprising a plurality of pixel matrix;
   a timing control driver, outputting a plurality of enable signals corresponding to the pixel matrix, wherein the enable signals are outputted by different timing; and
   a liquid crystal driving unit, electrically coupled to the cholesteric liquid crystal display panel and the timing control driver, and applying a reset voltage to the pixel matrix to clear a screen displayed by the pixel matrix after the liquid crystal driving unit receives the enable signal outputted by the timing control driver.

2. The cholesteric liquid crystal display device according to claim 1, wherein the cholesteric liquid crystal display panel further comprises a plurality of common electrodes (COM) and segment electrodes (SEG), and the common electrodes (COM) and the segment electrodes (SEG) constitutes the pixel matrix and electrically connected to the liquid crystal driving unit respectively.

3. The cholesteric liquid crystal display device according to claim 2, wherein the pixel matrix comprises at least a red pixel matrix, a blue pixel matrix and a green pixel matrix.

4. The cholesteric liquid crystal display device according to claim 3, wherein the timing control driver outputs a red enable signal, a blue enable signal, and a green enable signal corresponding to the red pixel matrix, the blue pixel matrix and the green pixel matrix to the liquid crystal driving unit respectively, and the timing control driver supplies the red enable signal, the blue enable signal, and the green enable signal by different timing.

5. The cholesteric liquid crystal display device according to claim 4, wherein the liquid crystal driving unit supplies a voltage to the common electrodes (COM) and the segment electrodes (SEG) of the pixel matrix respectively clear the screen of the pixel matrix after the liquid crystal driving unit receives the enable signals.

6. The cholesteric liquid crystal display device according to claim 5, wherein the voltage supplied the common electrodes (COM) and the segment electrodes (SEG) of the pixel matrix respectively is amplified so that the waveforms of a negative voltage and a positive voltage are not overlapped.

7. The cholesteric liquid crystal display device according to claim 1, wherein the enable signals are data latch enable signals in an electrical signal format.

8. The cholesteric liquid crystal display device according to claim 4, wherein each of the enable signals comprises a signal portion, and the signal portions corresponding to at least two of the red data latch enable signal (DLE R), the blue data latch enable signal (DLE B), and the green data latch enable signal (DLE G) are time-shifted.

9. The cholesteric liquid crystal display device according to claim 8, wherein each of the enable signals further comprises a natural resetting portion, and the interval of the signal portion is longer than that of the natural resetting portion.

10. A control method for reducing inrush current to clear a screen of a cholesteric liquid crystal display device, the method comprises the steps:
    providing the cholesteric liquid crystal display device which comprises a cholesteric liquid crystal display panel with a plurality of pixel matrix, a timing control driver, and a liquid crystal driving unit electrically coupled to the cholesteric liquid crystal display panel and the timing control driver respectively;
    outputting a plurality of enable signals corresponding to the pixel matrix by the timing control driver, wherein the enable signals are supplied by different timing; and
    receiving the enable signals and supplying a reset voltage corresponding to the pixel matrix by the liquid crystal driving unit to clear the screen displayed by the pixel matrix.

11. The control method for reducing inrush current to clear the screen according to claim 10, wherein the cholesteric liquid crystal display panel further comprises a plurality of common electrodes (COM) and segment electrodes (SEG), and the common electrodes (COM) and the segment electrodes (SEG) constitutes the pixel matrix and are electrically connected to the liquid crystal driving unit respectively.

12. The control method for reducing inrush current to clear the screen according to claim 10, wherein the pixel matrix further comprises at least a red pixel matrix, a blue pixel matrix and a green pixel matrix.

13. The control method for reducing inrush current to clear the screen according to claim 12, wherein the timing control driver outputs a red enable signal, a blue enable signal, and a green enable signal corresponding to the red pixel matrix, the blue pixel matrix and the green pixel matrix to the liquid crystal driving unit respectively, and the timing control driver supplies the red enable signal, the blue enable signal, and the green enable signal by different timing.

14. The control method for reducing inrush current to clear the screen according to claim 10, wherein the enable signals are data latch enable signals in an electrical signal format.

15. The control method for reducing inrush current to clear the screen according to claim 13, wherein the liquid crystal driving unit supplies a voltage to the common electrodes (COM) and the segment electrodes (SEG) of the pixel matrix respectively to clear the screen displayed by the pixel matrix after the liquid crystal driving unit receives the enable signals.

16. The control method for reducing inrush current to clear the screen according to claim 15, wherein the voltage supplied to the common electrodes (COM) and the segment electrodes (SEG) of the pixel matrix respectively is amplified so that the waveforms of a negative voltage and a positive voltage are not overlapped.

17. The control method for reducing inrush current to clear the screen according to claim 13, wherein each of the enable signals comprises a signal portion, and the signal portions corresponding to at least two of the red enable signal, the blue enable signal, and the green enable signal are time-shifted.

18. The control method for reducing inrush current to clear the screen according to claim 17, wherein each of the enable signals further comprises a natural resetting portion, and the interval of the signal portion is longer than that of the natural resetting portion.

* * * * *